(12) United States Patent
Zhu et al.

(10) Patent No.: US 8,738,358 B2
(45) Date of Patent: May 27, 2014

(54) MESSAGING TRANSLATION SERVICE APPLICATION SERVERS AND METHODS FOR USE IN MESSAGE TRANSLATIONS

(75) Inventors: Zhongwen Zhu, Saint-Laurent (CA); Patrick Parent, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 98 days.

(21) Appl. No.: 12/978,474

(22) Filed: Dec. 24, 2010

(65) Prior Publication Data

US 2013/0006602 A1    Jan. 3, 2013

(51) Int. Cl.
| | |
|---|---|
| G06F 17/28 | (2006.01) |
| G06F 17/20 | (2006.01) |
| G06F 17/27 | (2006.01) |
| G06F 17/21 | (2006.01) |
| G10L 21/00 | (2013.01) |
| G10L 11/00 | (2006.01) |

(52) U.S. Cl.
USPC .............. 704/4; 704/2; 704/3; 704/8; 704/9; 704/10; 704/270; 704/270.1; 704/275; 704/277; 704/278

(58) Field of Classification Search
USPC ............ 704/2, 3, 4, 8, 9, 10, 270, 270.1, 275, 704/277, 278
See application file for complete search history.

(56) References Cited

U.S. PATENT DOCUMENTS

| | | | |
|---|---|---|---|
| 5,884,246 A * | 3/1999 | Boucher et al. .................. 704/2 |
| 5,987,401 A * | 11/1999 | Trudeau ............................ 704/2 |
| 6,092,035 A * | 7/2000 | Kurachi et al. ................... 704/3 |
| 6,161,082 A * | 12/2000 | Goldberg et al. ................. 704/3 |
| 7,451,188 B2 * | 11/2008 | Cheung et al. ................ 709/206 |
| 7,702,685 B2 | 4/2010 | Shrufi et al. |
| 7,849,144 B2 * | 12/2010 | Prajapat et al. ............... 709/206 |
| 7,890,493 B2 * | 2/2011 | Chen ............................. 707/713 |
| 8,027,438 B2 * | 9/2011 | Daigle et al. .............. 379/88.06 |
| 2002/0022954 A1 * | 2/2002 | Shimohata et al. ............... 704/3 |
| 2002/0169592 A1 * | 11/2002 | Aityan ............................. 704/2 |
| 2002/0173946 A1 * | 11/2002 | Christy ............................ 704/2 |
| 2002/0193986 A1 * | 12/2002 | Schirris ............................ 704/8 |
| 2003/0125927 A1 * | 7/2003 | Seme ............................... 704/3 |
| 2004/0030781 A1 * | 2/2004 | Etesse et al. .................. 709/225 |
| 2004/0102956 A1 * | 5/2004 | Levin .............................. 704/2 |
| 2004/0102957 A1 * | 5/2004 | Levin .............................. 704/3 |

(Continued)

FOREIGN PATENT DOCUMENTS

WO    2010/062447 A1    6/2010

OTHER PUBLICATIONS

PCT Search Report from corresponding application PCT/IB2011/055981.

*Primary Examiner* — Edgar Guerra-Erazo
(74) *Attorney, Agent, or Firm* — Alex Nicolaescu; Ericsson Canada Inc.

(57) ABSTRACT

A method for message translation and a Messaging Translation Service Application Server (MTS AS) are provided for translating messages exchanged with, and among, social network services alike Facebook™ and Tweeter™. According to the invention, a message written in a first language by a user is received by a first social media network, which further obtains from other social media network(s) information related to a language used by therein. Then, the first social media network requests translation of the message from the first language into the language used by the other social network systems, and further sends the translated message to the other social network systems.

26 Claims, 5 Drawing Sheets

(56) References Cited

U.S. PATENT DOCUMENTS

| | | |
|---|---|---|
| 2004/0158471 A1* | 8/2004 | Davis et al. .................... 704/277 |
| 2005/0021323 A1* | 1/2005 | Li ..................................... 704/5 |
| 2005/0267738 A1* | 12/2005 | Wilkinson et al. ................ 704/9 |
| 2006/0133585 A1* | 6/2006 | Daigle et al. ................ 379/88.06 |
| 2007/0041370 A1* | 2/2007 | Cleveland .................... 370/352 |
| 2007/0168450 A1* | 7/2007 | Prajapat et al. .............. 709/207 |
| 2007/0294076 A1* | 12/2007 | Shore et al. ........................ 704/2 |
| 2008/0147378 A1* | 6/2008 | Hall ................................. 704/4 |
| 2008/0177528 A1* | 7/2008 | Drewes ............................. 704/2 |
| 2008/0195372 A1* | 8/2008 | Chin et al. ........................ 704/2 |
| 2008/0195482 A1* | 8/2008 | Sailer ............................. 705/14 |
| 2009/0024595 A1* | 1/2009 | Chen ................................ 707/4 |
| 2009/0119091 A1* | 5/2009 | Sarig ................................ 704/2 |
| 2009/0198487 A1 | 8/2009 | Wong et al. |
| 2009/0248392 A1 | 10/2009 | Talwar et al. |
| 2009/0265429 A1* | 10/2009 | Gestsson et al. .............. 709/204 |
| 2010/0114887 A1* | 5/2010 | Conway et al. ............... 707/737 |
| 2010/0159891 A1* | 6/2010 | Sigmund et al. .............. 455/413 |
| 2010/0204981 A1* | 8/2010 | Ribeiro et al. .................... 704/8 |
| 2010/0241417 A1 | 9/2010 | Bassett et al. |
| 2010/0313255 A1* | 12/2010 | Khuda .............................. 726/7 |
| 2012/0136943 A1* | 5/2012 | Paul et al. ..................... 709/206 |

\* cited by examiner

MESSAGING TRANSLATION SERVICE APPLICATION SERVERS AND METHODS FOR USE IN MESSAGE TRANSLATIONS

TECHNICAL FIELD

The present invention relates to the field of translation for messaging translations.

BACKGROUND

Social network services, also called social networks, social media portals, social media sites, social sites, social media servers, etc, and associated technologies are now everywhere. People like to share various types of information in the hope to reach contacts, also called friends, and/or as many individuals as possible. The objective is simple: share, learn and interact with others, may it be people who users know, or not.

Various social network services are currently offered to users. For example, Telefonaktiebolaget L M Ericsson (PUBL), called hereinafter Ericsson, is offering the LifeStore™ product which includes a social network service component for communicating with different other social sites. Open social API's (Application Programming Interfaces) are supported and included in the LifeStore product in order to allow seamless communication between LifeStore and other social network services sites such as for example Facebook™, Orkut™, Picasa™, Twitter™, or YouTube™ Lifestore™ allows a user to upload his/her media, such as for example text messages, images, audio or video files onto LifeStore™ and further enables bidirectional propagation (synchronization) of the user's media with other social sites. For example, when the user uploads a picture on the LifeStore™ account, Lifestore™ synchronizes that media with every other registered social network service of that user (as pre-configured by the user in his/her LifeStore account) and hence uploads the picture, for example, to the user's Facebook™ and Twitter™ accounts, insuring seamless propagation of the media, and sparing the user the need to manually connect and upload the media, individually, on every social network service.

Because the social network services are now easily available over the Internet, the pool of potential contacts, also sometimes called friends, is virtually unlimited.

A given North American user may, for example, regularly exchange information with people from Asia, Australia, Africa, or South America. With the existing product implementations, the user is able to post a message to multiple social networks simultaneously. However, each social network system receives the same message written in the original language used by the sending subscriber or poster. A problem arises in that the message reaches recipients in other countries or continents that do not understand the original language of the message. Therefore, the recipients may not be able to understand and "consume" the message properly. The problem may be further exacerbated in the context of commercial applications generating messages for an entire community of users for advertising purposes. For example, the Coca-Cola™ company may also possess a social network account on a given social network service and have a base of millions of connected "friends", residing in different countries and speaking different languages. Sending media that includes text written in a given language may not be adapted and appropriate for everyone in the pool of recipient users.

Although there is no solution as the one proposed by present invention, the US Patent Application Publication US 2009/0248392 A1 presents some relation with the field of the present invention. This publication teaches an instant messaging interface including a dialog region and a communication entry region that allows the sending user to select an automatic translation between the entered text and another language associated with a recipient user. Once the message is translated, it is communicated to the participating users in the instant messaging communication session. According to this publication, the sending user needs to specifically select the translation to take place.

The US Patent Application Publication US 2009/0198487 A1 also presents some relation with the field of the present invention. This publication provides techniques for translating of text in a social network. Translation of text phrases are received from members of the social network and include content displayed in a social networking system, such as content from social network objects. A particular member of the network is provided with content including a text phrase in a first language and the member requests translation into another language. Friends from the social network participate to the translation of the text which is then presented to the member requesting a translation.

However, none of the above cited publications solves the problem associated with the dissemination of a message written in a first language to multiple social network sites and to multiple users of those sites who can be using a different language than the one in which the original message is written. Nor do these publications solve the problem of sending a message to a single user whose preferred language is unknown to the sender.

Accordingly, it should be readily appreciated that in order to overcome at least the deficiencies and shortcomings of the existing solutions, it would be advantageous to have a method and system for seamless transmission of messages written in various languages among social network sites. The present invention provides such a method and system.

SUMMARY

According to a first aspect of the preferred embodiment of the invention, there is provided a method for message translation comprising the steps of receiving at a Messaging Translation Service Application Server (MTS AS) a message written in a first language, obtaining from the Social Media server (SM server) information related to a language used by the at least one SM server, requesting a translation of the message from the first language into the language used by the SM server, and sending a translation of the message in the language used by the at least one SM server to the at least one SM server.

According to a another aspect of the preferred embodiment of the invention, there is provided a MTS AS comprising a communication interface receiving at a message written in a first language, a processor operationally connected to the communication interface, and an instructions repository. The later stores instructions that when executed by the processor cause the later to obtain, via the communication interface, from the at least one Social Media server (SM server) information related to a language used by the at least one SM server, and to further instruct the communication interface to request a translation of the message from the first language into the language used by the at least one SM server, and to yet further instruct the communication interface to send a translation of the message in the language used by the at least one SM server to the at least one SM server.

According to yet another aspect of the preferred embodiment of the invention, there is provided a method for use in message translation comprising the steps of receiving from a first SM server at a second SM server a request for information related to a language used by the second SM server, determining by the second SM server the language used by the second SM server, and returning from the second SM server to the first SM server the language used by the second SM server.

According to yet a another aspect of the preferred embodiment of the invention, there is provided a second SM server comprising an input/output interface receiving from a first SM server a request for information related to a language used by the second SM server, a processor operationally connected to the input/output interface, and an instructions repository storing instructions that when executed by the processor cause the later to determiner the language used by the second SM server, and to return via the input/output interface to the first SM server the language used by the second SM server

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

According to a preferred embodiment of the present invention, social network systems are interconnected with each other via an interface that allows for the exchange of language information that can be used for translating an originating message into a destination language associated with each social network where the message is to be posted, or with groups and communities, or even with users of such social network systems. It is to be noted that social network services are also called both in the industry and in herein social networks, social media portals, social media sites, social sites, social media servers, and that such terminology is used herein interchangeably.

Figure 1:
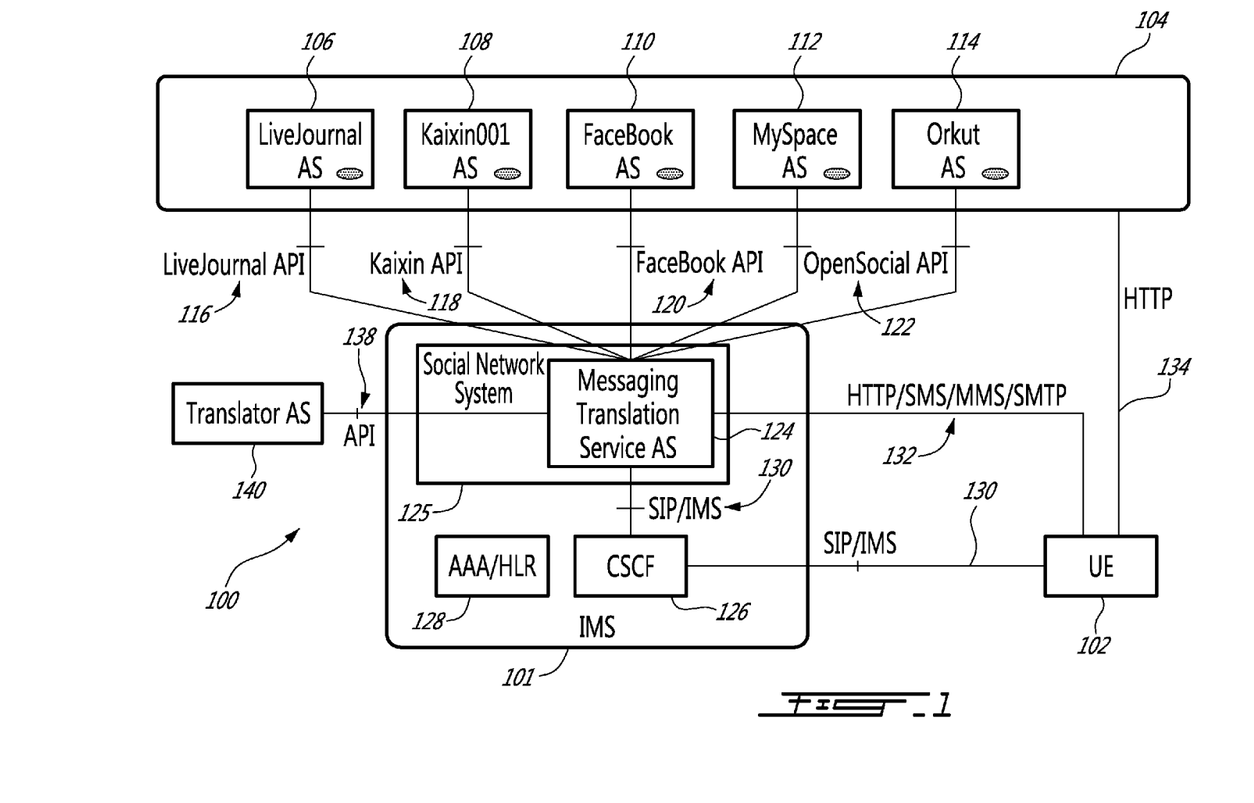
FIG. 1 is a simplified network diagram of an exemplary implementation of the preferred embodiment of the invention in a communications network.

Reference is now made to FIG. 1 which shows a high level network diagram of an exemplary implementation of the preferred embodiment of the invention in a communications network 100. Shown in the network 100, is an IMS (IP Multimedia Subsystem) network 101 that may comprise a Call State Control Function (CSCF) 126 responsible for routing requests, calls, and data sessions on behalf of the users. Served by the CSCF 126 is a User Equipment (UE) 102 that may communicate via a SIP/IMS interface 130 (e.g. based on the Session Initiation Protocol (SIP)) with the CSCF 126, and via the interface 132 with a social network system 125. The interface 132 may be an HTTP (Hyper Text transfer Protocol) interface if, for example, the system 125 is accessible over the Internet and a web browser, and/or an SMS/MMS (Short Messaging Service or Multimedia Messaging Service) interface if the system 125 is accessible via cellular messaging technologies, and/or and email/SMTP (Simple Mail transfer Protocol) interface in case it is accessible via email. An AAA server (Authentically, Authorization, and Accounting server), and/or a Home Location Register (HLR) 128 are operationally connected to the CSCF 126 and function to store subscriber information for subscribers of the network 101. Shown in the same IMS network 101, is a Messaging Translation Service Application Server (MTS AS) 124 that implements the preferred embodiment of the present invention. The MTS AS 124 may be part of, or connected to, the social network system 125 such as for example the LifeStore™ product, and may communicate with a translator application server 140 over an interface 138 in order to ask for translation of outgoing messages. Such messages may need to be further sent for posting to various other social network systems 106 through 114 that are part of, or can be accessed through, the Internet 104. A communication interface that may take the form of Application Programming Interface (APIs) 116 through 122 may connect the MTS AS 124 with various other social media systems, such as for example with LiveJournal™ application server 106, Kaixin001 ™ application server 108, Facebook™ application server 110, Myspace ™ application server 112, or Orkut™ application server 114.

In the exemplary scenario of FIG. 1, the UE 102 may post a message to the social network system 125 and the message may need to be replicated onto one or more of the social network sites 106 through 114, based for example on information stored in the social network system (e.g. pre-configured accounts of the other social network services) and/or the message itself (e.g. information stored in the message specifying to which other social network systems the message is to be sent). According to the invention, when the message is sent from the UE 102 for posting onto the social network system 125 via, for example, the communication interface 132 (that can take the form of an HTTP interface, an SMS message transmission, an MMS message transmission, or an email message transmission), the message reaches the social network system 125, which determines that the message needs to be posted on one or more of the servers 106 through 114. Based on this determination, the MTS AS 124 of the social network system 125 obtains, via the communication interfaces 116 through 122 the language used, or mostly used, on each one of the servers 106 through 114, or alternatively in the communities or groups to which the message is to be posted. Using the determined language(s), the MTS AS 124 may contact the translator application server 140 and ask for the requested translation(s) before sending the translated message out to the social media networks 106 through 114.

Figure 2:
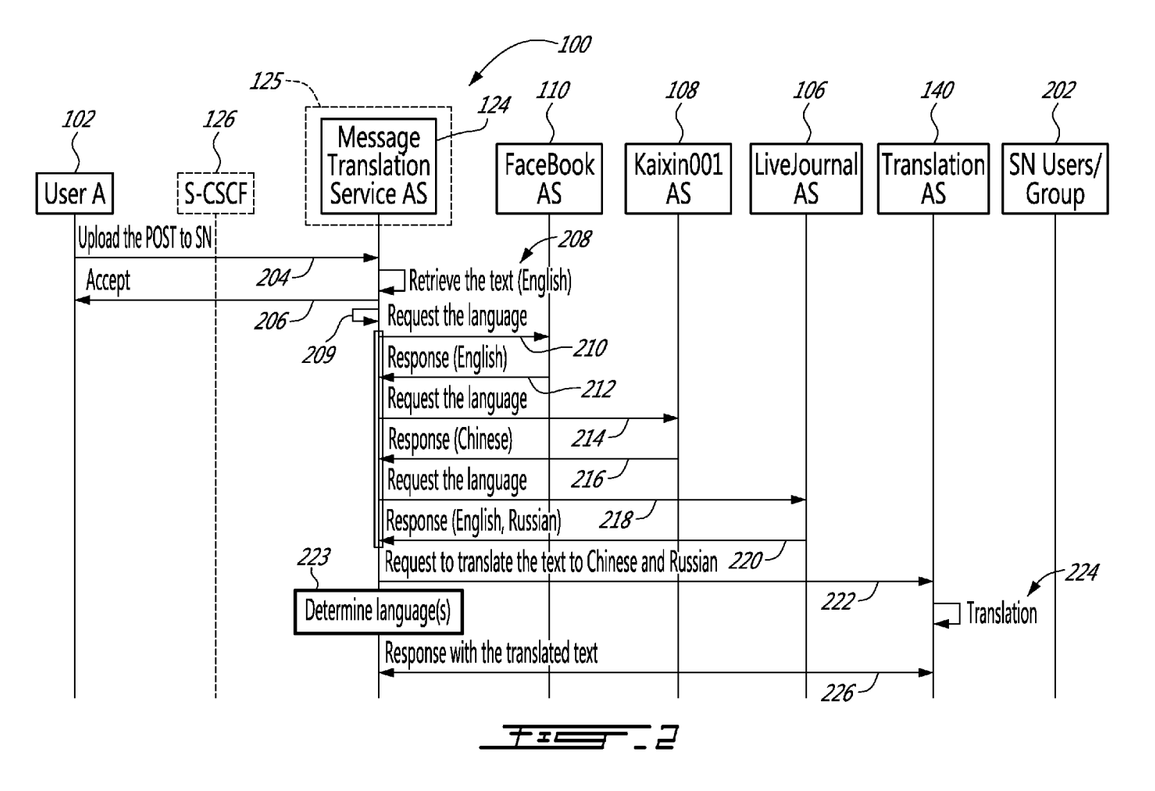
FIG. 2 is a nodal operation and signal flow diagram of another exemplary implementation of the preferred embodiment of the invention in the communications network.

Reference is now being made to FIG. 2, which shows a nodal operation and signal flow diagram of an exemplary implementation of the preferred embodiment of the invention in the communications network 100, as described herein before. Shown in the FIG. 2, are substantially the same elements as those previously described in relation to the FIG. 1. In the exemplary scenario shown in FIG. 2, it is first assumed that the user of the UE A 102 desires to upload a message that is originally written in the English language to his social network sites shown in FIG. 2, and which includes Facebook™ 110, Kaixin001 ™ 108, LiveJournal™ 106 and LifeStore™ 125. The later includes, or is otherwise operationally connected to the MTS AS 124. In action 204, the user of the UE A 102 uploads the message post to the social network 125. In action 208, the social network system 125 retrieves the message written in the English language and in action 206 it confirms the receipt of the message back to user of the UE A 102. In action 209, the social media system 125 determines that the message is to be posted on one or more social network systems based, for example, on information comprised in the incoming message, or based on a pre-configuration effectuated by the user of the UE A 102 with the LifeStore™ social network system 125. Being now provided with the identities of the social network systems that need to be further provided with the message, the MTS AS 124 moves to determine if the message can, or should be posted in the original language it is written, or of it needs translation. For this purpose, the MTS AS 124 requests the language used by the social media servers or by the groups and possibly their associated users to which the message is to be posted to. For example, in actions 210, 214, 218 the MTS AS 124 contacts the social media networks and requests their associated, or preferred language for posting of the message. The requests 210, 214, and 218 may request the preferred language of a given social network system, of a given group of friends (contacts) within the given social network system, or even of a given discussion (e.g. chat) thread between the group of friends of a given social network system. Therefore, the requests 210, 214, and 218 may optionally also comprise a sender identifier identifying the originator user A, and/or a message identifier that may link the original message to a discussion (chat) thread.

Responsive to the requests 210, 214, and 218, in actions 212, 220 and 216 the MTS AS 124 is provided back by each contacted social network system with the preferred language of each such system. This language, or these languages, may be the language(s) mostly used on each one of the social media servers, or within the groups of friends, or within the discussion thread linked to the message. In particular, in the exemplary scenario described herein, Facebook™ application server 110 answers that the English language is to be used, Kaixin™ application server 108 answers back that the Chinese language is to be used, while LiveJournal™ application server 106 answers back that both the English language and the Russian language are to used (since for example the chat thread to which the message is destined is unfolding in both English and Russian).

Figure 4:
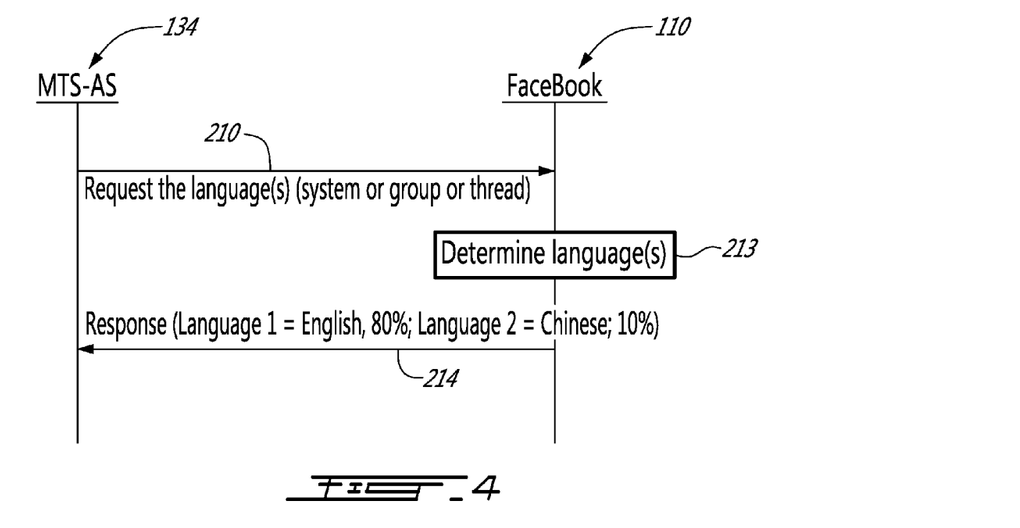
FIG. 4 is another nodal operation and signal flow diagram illustrative of an exemplary variant of the preferred embodiment of the invention.

According to a variant of the preferred embodiment of the invention, a reply alike the replies 212, 220 and 216 received by the MTS AS 124 from the social network systems is shown in FIG. 4, and may further include other language information allowing the MTS AS 124 to determine a target language for translation, if any is needed. The request for the language sent in action 210 may include a request for the preferred language associated with any one of or more of the entire social network system, the group of friends to which the sender belongs to, and the discussion thread the original message is linked to (if any). The request for the language of action 210 may also further include a sender identifier or a message identifier. In action 213, the social network server determines the language based on the request 210, and in action 214 replies back with the preferred language. According to this variant of the preferred embodiment of the invention, the reply 214 may take various forms. For example, the reply may only include reference to one preferred language, as shown in FIG. 2. In a further example, as shown in FIG. 4, the reply may include weighted coefficient values related to the usage of one or more language in the social network system, the groups of friends, or the discussion thread. For example, the reply 214 may include information that the language 1 (e.g. English) is used in 80% of cases, while a language 2 (e.g. Chinese) is used in 10% of the cases.

With reference being now made back to FIG. 2, in action 223 the MTS AS 124 then determines based on the information received in the replies 212, 220 and 216 the languages in which the message needs to be translated and posted on the different social network systems. Therefore, in action 222, it requests the translation application server 140 to proceed with the translation of the message from its original English language towards e.g. Chinese and Russian. The translation AS 140 proceeds with the requested translation(s) in action 224, and in action 226 responds back to the MTS AS 124 with the translation of the original message from the first language (English language), into the language used by the social network systems (e.g. Chinese and Russian).

In an optional variant of the preferred embodiment of the invention, the MTS AS 124 may send in action 228 the translations to be reviewed and approved by the user A 102. In action 229, the user may proceed to the review and the approval of the translation text, and in action 230 the user A may send back to the MTS AS 124 his approval for the translated text for each translation. Upon receipt of the approval, or directly following action 226, the MTS AS 124 proceeds to upload the translated message under respective social media servers.

In action 232, the original English message is uploaded on Facebook 110 since there is no need for any translation. A notification is sent to the user, or group, or community to inform of the pending new message in action 234. Confirmation of the new message being posted is sent back to the MTS AS server 124 in action 236 which may be forwarded back to the user A 102 (action not shown). Likewise, the MTS AS 124 proceeds to upload the Chinese translation of the original message in action 238 to the Kaixin001 ™ server 108 and again sends the notification to the users or to the related group in order to notify of the posting of the new message in action 240, and further confirms to the MTS AS 124 the success of the delivery in action 242. In action 243, the MTS AS 124 combines the original English message with the Russian translation of the message (since the LiveJournal™ server 106 answered in the previously described action 220 that both the English and Russian languages are preferred for the message posting) and sends in action 244 the combined message in English language and in Russian to the LiveJournal ™ server 106. Assuming that, for example, the message is for being posted in a chat or discussion thread that unfolds in both Russian and English, in action 246 the LiveJournal ™ server 106 determines in what language to send the notification for advising the users of the new posting, and in actions 248 and 250 notifies in English and in Russian respectively, of the new message post based on the determination of action 246. For example, in action 248 the LiveJournal™ server 106 may notify a user who posted in English previous messages on the given discussion thread, while in action 250 the LiveJournal™ server 106 may notify in Russian a user who posted previous messages in Russian on the given discussion thread.

In action 252, the LiveJournal™ server 106 reports the successful delivery of the notifications and of the message posting to the MTS AS 124.

Figure 3:
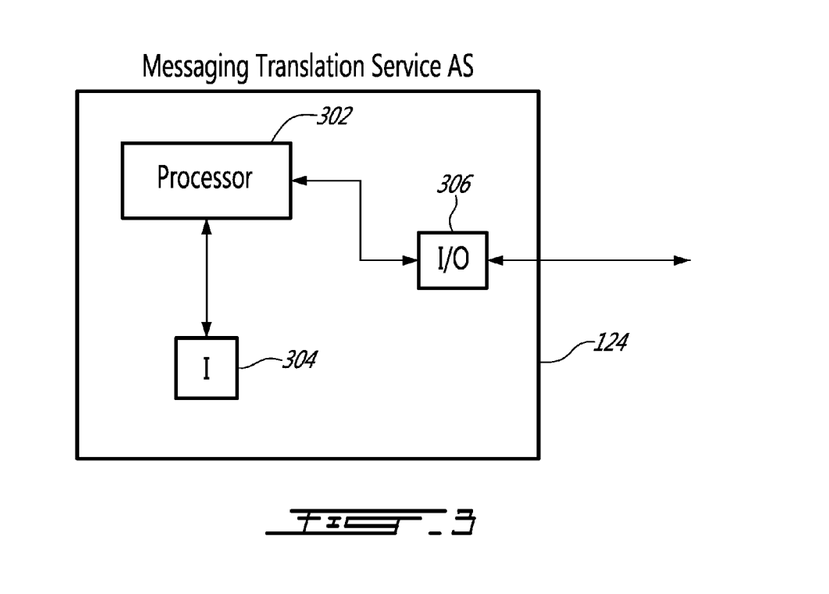
FIG. 3 is a simplified block diagram showing an exemplary implementation of the preferred embodiment of the invention in a Messaging Translation Service Application Server (MTS AS)

Reference is now made to FIG. 3 which shows an exemplary block diagram of the MTS AS 124 according to the preferred embodiment of the present invention. The MTS AS 124 comprises a communication interface 306 configured for receiving a message written in a first language, such as for example the English language. The MTS AS 124 further comprises a processor 302 that is operationally connected to the communication interface 306 and which receives the message from the later. The AS 124 also comprises an instruction repository 304 configured to store instructions that when executed by the processor 302 cause the later to determine that the message is to be posted on at least one social network system and to obtain from the at least one social media server information related to the language used by the at least one social media server, as described also in relation to FIG. 2. The instructions stored on the repository 304 may be further executed by the processor and cause to the communication interface 306 to request the translation of the message from the first language, such as for example the English language, into another language used by the least one social media server.

The instructions further instruct the communication interface 306 to send the translation of the message in the language used by the at least one social media server to the server in question. Finally, the instructions when executed by the processor 304 may yet further cause the later to produce alone or in combination with the communication interface 306 the actions described hereinbefore in relation to the FIG. 2 that pertain to the TMC AS 124, including the processing of all incoming messages, and the transmission of the outgoing messages from the MTS AS 124, as shown in FIG. 2.

Figure 5:
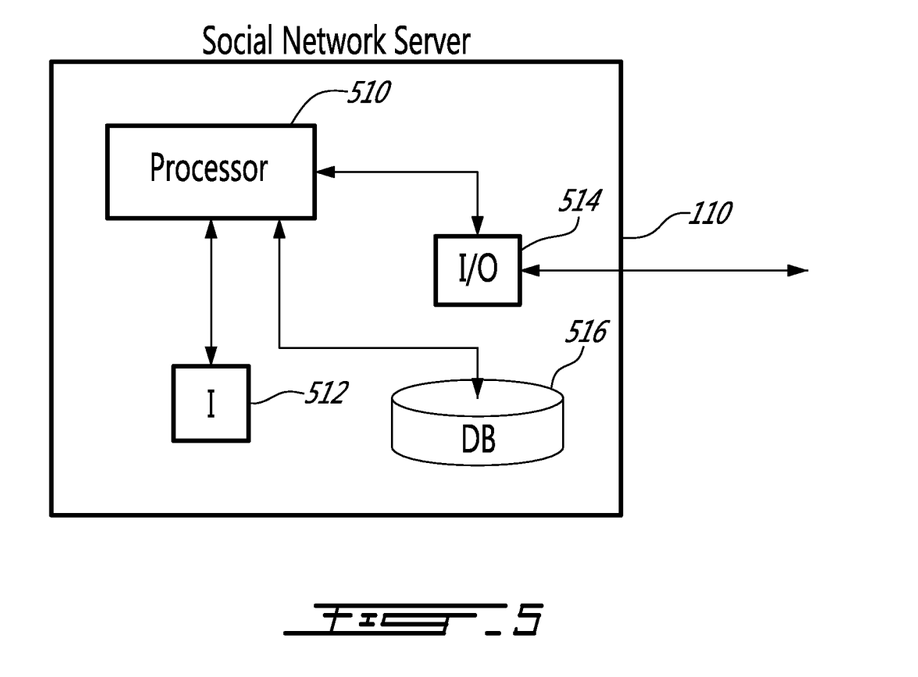
FIG. 5 is a block diagram of an exemplary implementation of the preferred embodiment of the invention in a social network system.

Reference is now made to FIG. 5, which shows a block diagram of an exemplary implementation of the preferred embodiment of the invention in a social network system, such as for example a system alike the Facebook™ server shown in FIG. 2. The server 110 comprises an input/output interface 514 supporting communications with users and other social network services and a media and subscriber database 516 that stores the users' posted media, chats, pictures, and other user data. The server 110 further comprises a processor 510 operationally connected to the database 516 and to the input/output interface 514, and an instructions repository 512. The later stores instructions that when executed by the processor 510 cause the later to perform on behalf of the server 110 the actions shown in FIG. 2 related to the servers 110, 108, 106. In particular, the instructions cause the processor 510, when the input/output interface 514 receive a request for a language used by the server 110 or within certain user groups of the server 110, to determine that or those used or preferred language(s) by communicating with the database 516, and to return, via the input/output interface 514, the determined languages as also shown in relation to FIG. 2.

Those skilled in the art will readily appreciate that the present invention provides for an easy and seamless solution to the posting of messages in various languages through multiple social network systems in a manner that is totally transparent to the user. According to the preferred embodiment of the invention, an original message written in a first language may be posted in any language by the sending user, and is translated into various other more appropriate languages used by the different communities, groups, or social media networks across the Internet cloud.

Based upon the foregoing, it should now be apparent to those of ordinary skills in the art that the present invention provides an advantageous solution for translation of messages exchanged among social network systems. Although the system and method of the present invention have been described in particular reference to certain preferred embodiments, it should be realized upon reference hereto that the innovative teachings contained herein are not necessarily limited thereto and may be implemented advantageously in various manners. For example, in a variant of the preferred embodiment of the invention, any one of the following possibilities can be used in order to determine in what language the initial message is to be translated: the language provided by the social media network site that is most commonly used by that social media network site; a language that is most used by the group to which the message is to be posted within a given social media network site. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. A method for message translation for multiple social media systems, comprising the steps of:
   a. receiving at a Messaging Translation Service Application Server (MTS AS) a message written in a first language;
   b. requesting and obtaining from multiple Social Media servers (SM servers) information related to a language used by each one of the SM servers;
   c. requesting translation of the message from the first language into the language or languages used by the SM servers; and
   d. sending a translation of the message in the language used by each one of the SM servers to the respective one of the multiple SM server.

2. The method of claim 1, further comprising the step of:
   e. prior to step b., determining that the message is to be posted on the multiple SM servers.

3. The method of claim 1, wherein the MTS AS is included in an SM server that receives the message written in the first language.

4. The method of claim 3, wherein step b. is repeated for each one of the SM servers.

5. The method of claim 1, wherein step c. comprises the steps of:
   c.1. sending a request to a translator application server for the translation of the message from the first language into the language used by each of the multiple SM servers; and
   c.2. receiving back the translation of the message in the language used by each of the multiple SM servers.

6. The method of claim 1, wherein step b. comprises the steps of:
   b.1. sending a request for the information related to the language used by the each one of the multiple SM servers, wherein the language used by the each one of the multiple SM servers is a language associated with a group of users within the SM server; and b.2. receiving back from the each one of the SM servers the information related to the language associated with the group of users within the SM server.

7. The method of claim 6, wherein the information further comprises a language weight coefficient indicative of a frequency of the usage of the language in the group of users of the SM server.

8. The method of claim 1, further comprising the steps of:

e. before step d., sending the translation of the message to a user who originated the message for approval; and f. receiving back from the user an approval of the translation before proceeding with step d.

9. A Messaging Translation Service Application Server (MTS AS) for translating messages for multiple social media systems, the MTS AS comprising:

a communication interface receiving at a message written in a first language;

a processor operationally connected to the communication interface; and an instructions repository storing instructions that when executed by the processor cause the later to request and obtain, via the communication interface, from multiple Social Media servers (SM servers) information related to a language used by each one of the SM servers, and to further instruct the communication interface to request a translation of the message from the first language into the language or languages used by each one of the SM server, and to further instruct the communication interface to send a translation of the message in the language used by each one of the SM servers to the respective SM server.

10. The MTS AS of claim 9, wherein the instructions repository comprises further instructions that when executed by the processor further cause the processor to determine that the message is to be posted on the multiple SM servers.

11. The MTS AS of claim 9, wherein the MTS AS is included in an SM server that receives the message written in the first language.

12. The MTS AS of claim 11, wherein the processor obtains from each SM servers the information related to a language used by each one of the SM servers, and the communication interface requests the translation of the message from the first language into the language used by each SM server.

13. The MTS AS of claim 9, wherein for obtaining information related to the language used by each one of the multiple SM servers, the communication interface sends a request to a translator application server for the translation of the message from the first language into the language used by each SM server, and receives back the translation of the message in the language used by each SM server.

14. The MTS AS of claim 9, wherein for obtaining information related to a language used by each SM server, the communication interface sends a request for the information related to the language used by each SM server, wherein the language used by each-SM server is a language associated with a group of users within the respective SM server, and wherein the communication interface receives back from each SM server the information related to the language associated with a group within the SM server.

15. The MTS AS of claim 14, wherein the information further comprises a language weight coefficient indicative of a frequency of the usage of the language in the SM server.

16. The MTS AS of claim 9, wherein the communication interface sends the translation of the message to a user who originated the message for approval and receives back from the user an approval of the translation before sending the translation of the message in the language used by each of the SM servers.

17. A method for use in message translation comprising the steps of:

a. receiving from a first Social Media Server (SM server) at a second SM server a request for information related to a language used by the second SM server;

b. determining by the second SM server the language used by the second SM server; and c. returning from the second SM server to the first SM server the language used by the second SM server.

18. The method of claim 17, wherein the language used by the second SM server is a language mostly used by the second SM server.

19. The method of claim 17, wherein the language used by the second SM server is a language mostly used by a group of users of the second SM server.

20. The method of claim 17, wherein the language used by the second SM server is a language mostly used in a discussion thread of the second SM server.

21. The method of claim 17, wherein step c. comprises returning from the second SM server to the first SM server a weight coefficient value representative of a usage of a language in the second SM server.

22. A second social media server (SM server) comprising:

an input/output interface receiving from a first SM server a request for information related to a language used by the second SM server;

a processor operationally connected to the input/output interface;

an instructions repository storing instructions that when executed by the processor cause the later to determine the language used by the second SM server, and to return via the input/output interface to the first SM server the language used by the second SM server.

23. The SM server of claim 22, wherein the language used by the second SM server is a language mostly used by the second SM server.

24. The SM server of claim 22, wherein the language used by the second SM server is a language mostly used by a group of users of the second SM server.

25. The SM server of claim 22, wherein the language used by the second SM server is a language mostly used in a discussion thread of the second SM server.

26. The SM server of claim 22, wherein step c. comprises returning from the second SM server to the first SM server a weight coefficient value representative of a usage of a language in the second SM server.

* * * * *